Patented May 28, 1935

2,002,642

UNITED STATES PATENT OFFICE 2,002,642

REACTION PRODUCT OF KETONES AND AMINES

Ludwig Meuser and Percy Joshua Leaper, Naugatuck, Conn., assignors, by mesne assignments, to United States Rubber Company, New York, N. Y., a corporation of New Jersey No Drawing. Application April 28, 1932, Serial No. 608,129

52 Claims. (Cl. 260—130)

This invention relates to the preparation of reaction products of ketones and secondary amines containing only secondary amino groups, and more particularly to an improved process of combining such materials and to the improved products resulting therefrom.

This case is a continuation-in-part of copending application Serial No. 537,989, filed May 16, 1931.

It has now been found that ketones and amines difficult to react at relatively low temperatures and pressures can be readily reacted under such conditions, for the production of desirable products, if a certain catalyst for the reaction is employed, namely a halogen acid such as hydriodic acid (hydrogen iodide), the proportion of acid being such as to enable it to function only as a catalyzer for the reaction. The use of such an acid avoids the necessity of using high temperature and pressure equipment, and allows of combining the materials at temperatures not substantially higher than 100° C. under a reflux open to the atmosphere or in a system closed to avoid solvent loss. In the latter instance the incidental pressures normally do not exceed approximately 20 lbs. per sq. in. gauge (35 lbs. per sq. in. absolute). Formerly temperatures as high as 250° C. and pressures as high as 600 lbs. per sq. in. (gauge) have been required and the advantages of the present invention are therefore apparent. The use of such an acid also allows of producing in solid form certain ketone-amine reaction products that heretofore have existed only in liquid or semi-liquid form, for example the acetone-phenyl beta naphthylamine reaction products, and having superior properties as rubber antioxidants.

The following examples are given to illustrate the invention and are not to be construed as limiting thereof:

Example 1.—438 grams of phenyl beta naphthylamine and 232 grams of acetone are refluxed together at atmospheric pressure for about 48 hours in the presence of 50 grams of 47.8% hydriodic acid. The reaction mixture is then distilled up to a liquid temperature of approximately 110° C. thereby removing approximately 180 grams of distillate. The distillate is essentially a mixture of water and acetone. The residue from this distillation weighs about 530 grams. On cooling it sets to a hard resinous mass which can be pulverized to powder form. The powder has a softening range of 64–71° C. and an iodine content of about 2.9%.

This material when incorporated with rubber in the usual manner and the rubber vulcanized, improves the properties of the rubber stocks, particularly tube and tire tread stocks to a marked degree. Among the beneficial characteristics imparted are substantially no effect on the rate of cure, protection against heat deterioration, protection against oxidation, improvement in flexing both before and after ageing of the vulcanized rubber, improvement in resistance to abrasion after ageing in the vulcanized rubber.

Instead of reacting the materials under atmospheric pressures, the reaction works as well under slightly elevated temperatures for example 100° C. which reduces the time required for the above reaction. This is illustrated by the following example. It will be observed therein that the pressure, approximately 20 lbs. per sq. in. (gauge) at the start, gradually falls off during the course of the reaction as the acetone chemically combines with the amine with liberation of a gradual increasing amount of water. This inital pressure is merely incidental to using refluxing temperatures slightly in excess of the boiling point of the lowest boiling constituent in the early stages of the reaction. A temperature of 100° C. is sufficiently high to maintain active boiling in the system at all times, even with higher concentrations of water present.

Example 2.—43.8 grams of phenyl beta naphthylamine and 23.2 grams of acetone are placed, together with 5 grams of 47.8% hydriodic acid, in a suitable vessel which may thereafter be closed to the atmosphere to avoid solvent loss. The mixture is heated about 24 hrs. at 100° C. At the end of this time the vessel is opened and the reaction product recovered from unreacted materials as described in Example 1. An excellent yield of a hard resinous reaction product results.

It will be noted in Example 2 that a slight elevation of temperature causes the reaction to take place in one-half the time cited in Example 1.

Example 3.—43.8 grams of phenyl beta-naphthylamine and 23.2 grams of acetone are placed together with 2.5 grams of 47.8% hydriodic acid in a suitable vessel which may thereafter be closed to the atmosphere to avoid solvent loss. The mixture is heated for about 48 hrs. at 100° C. At the end of this time the vessel is opened and the contents treated as described in Example 2. An excellent yield of a hard resinous product is obtained.

It will be noted in Example 3 that the amount of catalyst may be reduced by one-half, to effect an economy, without extending the reaction time beyond that of Example 1. The reactants may be added in successive steps or stages, after removing water separating during the reaction between the ketone and the secondary aromatic amine which contain water-forming groups and/or elements which combine chemically to form water. This is illustrated by the following example:

*Example 4.*—438 grams phenyl-beta-naphthylamine and 232 grams of acetone were refluxed 48 hours at atmospheric pressure in the presence of 25 grams 47.8% hydriodic acid. The reaction mixture was then distilled to 110° C. (liquid temperature) during which 167 grams of 85% acetone were removed, the difference (15%) being water. 232 grams of fresh acetone were then added to the residue and refluxing continued for 60 hours. The reaction product was then distilled up to 130° C., during which 253 grams of distillate consisting of acetone and water were removed, leaving 515 grams of reaction product. The slate colored solid product, having a softening range from 78–83° C. and containing 5.15% nitrogen, was found to possess excellent antioxidant properties.

If desired the amount of hydriodic acid may be increased in order to reduce the reaction time, it still being used in such proportions as to enable it to function only as a catalyzer. Instead of removing water that forms and separates in the first refluxing step by distillation, it may, if desired, be removed by decantation instead. However, where decanting is used, fresh catalyst as well as fresh acetone should be added for the second refluxing operation, since the catalyst is soluble in the aqueous phase of the mixture and removing water would remove some of the catalyst.

By carrying the reaction out in two stages as in Example 4, a method is provided for controlling the mass action, and causing a further condensation between the ketone and the amine through the removal of the water formed in the first step, which if not removed causes the reaction to reach an equilibrium.

Instead of using hydriodic acid in conjunction with relatively low temperatures, hydrobromic acid may be used. To obtain similarly satisfactory reaction products with hydrochloric acid as a catalyst, it is essential that a small amount of one of the two halogen acids previously cited be present, preferably hydriodic acid.

The materials may be used for retarding the deterioration of rubber and in some cases their anti-oxidant properties may be greatly improved by heating the dried reaction product recovered from the refluxing step to a sufficiently high temperature to produce a further condensation within the material, during which treatment other water-forming groups and/or elements are split off and combined chemically to form free water. This water does not exist as water in the reaction product before heating but is potentially present by reason of the ability of water-forming groups and/or elements, containing hydrogen and oxygen, to unite chemically under the heat treatment. The character of the reaction product is therefore chemically changed. This improvement by subsequent heat treatment occurs particularly with the acetone-diphenylamine reaction product prepared according to the process below described using hydriodic acid as a catalyst. In such case when the reaction product is heated to temperatures as high as 250° C. an exothermic rise in temperature follows during which time water is split off while the reaction product originally existing as a white crystalline solid melting at 179°–184° C. changes to a dark tarry-like liquid. Furthermore, whereas the reaction product recovered from the reflux step might be considered as somewhat inferior in antioxidant properties in rubber, the dark tarry material recovered from the heat treatment is a definitely superior antioxidant of highest value in preserving rubber compounds.

*Example 5.*—415 grams of diphenylamine and 285 grams of acetone are refluxed together at atmospheric pressure in the presence of 36 grams of 47.8% hydriodic acid for 48 hours. The reaction mixture is then distilled up to a liquid temperature of 130° C. thereby removing approximately 180 grams of distillate, consisting essentially of a mixture of acetone and water. The dried residue remaining after distillation weighs about 520 grams, and, occurs as a white solid melting 179°–184° C. and containing about 6.3% nitrogen. The antioxidant value of this reaction product is relatively inferior and may be improved as follows:

490 grams of this reaction product, prepared as above described under a refluxing operation, are heated to 250° C. for three hours by means of a surrounding bath containing a low melting alloy as the heat transfer medium, e. g. Wood's metal. Care should be taken that the external source of heat be controlled to compensate for the heat formed exothermically within the reaction mixture. During this period it will be noted that water is being eliminated leaving approximately 473 grams of a dark viscous liquid.

The 36 grams of 47.8% hydriodic acid used above may be replaced by 33.76 grams of 34% hydrobromic acid and the reaction carried out in essentially the same manner. The final product, however, was found to be somewhat inferior in antioxidant qualities to the product prepared with hydriodic acid catalyst.

The dried acetone-phenyl beta naphthylamine reaction product prepared by the reflux method as previously described in Example 1 may be treated in a similar manner but in this case heating of the dried product is carried to 150° C. whereupon a strong exothermic reaction follows with elimination of water that carries the temperature to about 190° C. without the necessity of further application of heat.

While acetone, phenyl beta-naphthylamine and diphenylamine have been emphasized in the examples, other ketones such as diethyl ketone, ethyl methyl ketone, acetophenone, benzophenone, phorone, cyclopentanone, benzal acetone, furfural acetone, mesityl oxide, etc. may be used, and also other amines, such as alpha alpha dinaphthyl amine, beta beta dinaphthylamine, N, N' diphenyl-ethylene diamine, mono-methyl aniline, mono-ethyl aniline, phenyl alpha-naphthylamine, N,N', dinaphthyl para phenylene diamine, etc. may be used.

Although the processes described have been applied to the preparation of ketone-amines as the end products, it may also be applied to the preparation of their aldehyde or other derivatives when such preparation involves the production of ketone-amines at a preliminary stage in the entire process. Also the separated reaction products may be treated in any desired manner to further purify them from unreacted materials, undesirable impurities, etc.

It was further found that by treating the reaction products with alkali solutions, e. g. ammonia, sodium or potassium hydroxide, etc. and removing any excess alkali by washing with water that the resulting products showed marked improvement in anti-oxidant properties. Organic solvents such as acetone and alcohol may, if desired, be used as aids or auxiliary agents in the alkali treatment process. To illustrate: The products prepared as above described are treated with 1 to 5 times their weight of aqueous ammonia, with or without additional water, and the mixture heated gently to about 30–40° C. with thorough agitation for about 1–3 hrs. Thereafter the reaction product is thoroughly washed with water and finally dried by heating to about 150° C. liquid temperature at ordinary pressure. If desired, the product may be thinned or softened, either before or after treating with alkali, by addition of a water soluble solvent such as alcohol or acetone, and the solvent subsequently removed with excess alkali by washing with water. A similar improvement in antioxidant properties was noted, when the reaction products were treated with an equal weight of aqueous 10% sodium hydroxide instead of aqueous ammonia. Whereas the proportions of alkali cited above are preferred, it will be obvious that the proportions may be varied over a wide range, depending on such factors as the physical characteristics of the particular reaction product being treated, the efficiency of the agitation available, amount of catalyst used, etc. Furthermore, under maximum efficiency of agitation, an improved product can be obtained by washing solely with water, but the hazards incidentally to variation in antioxidant properties require careful supervision. Again, in certain specific cases, an improvement will be noted where an equivalent amount of alkali, based on the catalyst, is added in aqueous solution with no washing step prior to final drying. The latter is not recommended as a general method for, in addition to possible variation in antioxidant properties caused by foreign material, there is the constant danger that such impurities may be decomposed or activated under conditions met in vulcanization to change the normal rate of cure, ageing properties of such rubber stocks, etc. These effects would be different for each of the several groups of accelerators now used.

If desired combinations of one or more of the improvements noted in the above examples may be practiced in a single process without departing from the scope and extent of the invention.

With the detailed description given above, it will be obvious that certain modifications will suggest themselves which would offer certain advantages from a cost standpoint. For example, instead of adding one halogen acid as a catalyst, a mixture of halogen acids might be used, or the present catalysts may be used in addition to or in conjunction with known catalysts, all without departing from the principles of the invention and it is not desired to limit the invention otherwise than as set forth in the appended claims.

Having thus described our invention, what we claim and desire to protect by Letters Patent is:

1. A process which comprises reacting a ketone and an aromatic amine containing only secondary amino groups at temperatures not substantially higher than 100° C., in the presence of catalytic amounts of halogen acid, the halogen portion thereof having an atomic weight of at least approximately 79.9.

2. A process which comprises bringing hydrogen halide the halogen portion of which has an atomic weight of at least approximately 79.9 into contact with a ketone and an aromatic amine containing only secondary amino groups and heating the materials at temperatures not substantially higher than 100° C., the amount of halide being such as to enable it to function as a catalyzer.

3. A process which comprises bringing hydrogen halide the halogen portion of which has an atomic weight of at least approximately 79.9 into contact with a ketone and an aromatic amine containing only secondary amino groups and heating the materials at temperatures not substantially higher than 100° C., the amount of halide being such as to enable it to function as a catalyzer, separating the resulting ketone-amine reaction product from water and unreacted materials and then subjecting said reaction product to a heat treatment to further react water forming groups to split off further water.

4. A process which comprises bringing hydrogen halide the halogen portion of which has an atomic weight of at least approximately 79.9 into contact with a ketone and an aromatic amine containing only secondary amino groups and heating the materials at temperatures not substantially higher than 100° C., the amount of halide being such as to enable it to function as a catalyzer, separating the resulting ketone-amine reaction product from water and unreacted materials and then subjecting said reaction product to a heat treatment to further react water forming groups to split off further water, and subsequently separating and washing the resulting reaction product with alkali and water.

5. A process which comprises bringing hydrogen halide the halogen portion of which has an atomic weight of at least approximately 79.9 into contact with a ketone and an aromatic amine containing only secondary amino groups and heating the materials at temperatures not substantially higher than 100° C., the amount of halide being such as to enable it to function as a catalyzer, separating the resulting ketone-amine reaction product from water and unreacted materials and then subjecting said reaction product to a heat treatment to further react water forming groups to split off further water, and subsequently separating and washing the resulting reaction product with ammonia and water.

6. A process which comprises bringing hydrogen halide the halogen portion of which has an atomic weight of at least approximately 79.9 into contact with an aliphatic ketone and an aromatic amine containing only secondary amino groups and heating the materials at temperatures not substantially higher than 100° C., the amount of halide being such as to enable it to function as a catalyzer, separating the resulting ketone-amine reaction product from water and unreacted materials and then subjecting said reaction product to a heat treatment to further react water forming groups to split off further water.

7. A process which comprises bringing catalytic amount of hydrogen halide into contact with an aliphatic ketone and an aromatic amine containing only secondary amino groups and heating the materials at temperatures not substantially higher than 100° C., the halogen portion of the halide having an atomic weight of at least approximately 79.9, separating the resulting ketone amine reaction product from water and unreacted materials, and then subjecting said reaction product to a heat treatment to further react water forming groups to split off further water.

8. A process which comprises bringing a catalytic amount of hydrogen halide into contact with a ketone and an aromatic amine containing only secondary amino groups and heating the materials at temperatures not substantially higher than 100° C., the halogen portion of the halide having an atomic weight of at least approximately 79.9, separating the resulting ketone-amine reaction product from water and unreacted materials and then subjecting said reaction product per se to a heat treatment to release further water of condensation.

9. A process which comprises bringing a catalytic amount of hydrogen halide into contact with an aliphatic ketone and an aromatic amine containing only secondary amino groups and heating the materials at temperatures not substantially higher than 100° C., the halogen portion of the halide having an atomic weight of at least approximately 79.9, separating the resulting ketone-amine reaction product from water and unreacted materials and then subjecting said reaction product per se to a heat treatment to release further water of condensation.

10. A process which comprises reacting a ketone and an aromatic amine containing only secondary amino groups by refluxing the materials under atmospheric pressure in the presence of a catalytic amount of hydrogen halide the halogen portion of the halide having an atomic weight of at least approximately 79.9, removing unreacted acetone and water, adding fresh acetone to the residue and repeating the refluxing operation.

11. A process which comprises reacting an aliphatic ketone and an aromatic amine containing only secondary amino groups by refluxing the materials under atmospheric pressure in the presence of a catalytic amount of hydrogen halide the halogen portion of the halide having an atomic weight of at least approximately 79.9, removing unreacted acetone and water, adding fresh acetone to the residue and repeating the refluxing operation.

12. A process of preparing ketone-amine reaction products which comprises bringing a catalytic amount of hydriodic acid into contact with a ketone and an aromatic amine containing only secondary amino groups and heating the materials at temperatures not substantially higher than 100° C.

13. A process which comprises bringing a catalytic amount of hydrogen halide into contact with an aliphatic ketone and an aromatic secondary amine and heating the materials at temperatures not substantially higher than 100° C., the halogen portion of the halide having an atomic weight of at least approximately 79.9.

14. A process which comprises bringing a catalytic amount of hydrogen halide into contact with an aliphatic ketone and an aromatic amine containing only secondary amino groups and heating the materials at temperatures not substantially higher than 100° C., the halogen portion of the halide having an atomic weight of at least approximately 79.9.

15. A process of preparing ketone-amine reaction products which comprises bringing a catalytic amount of hydriodic acid into contact with an aliphatic ketone and an aromatic amine containing only secondary amino groups and heating the materials at temperatures not substantially higher than 100° C.

16. A process of preparing ketone-amine reaction products which comprises bringing a catalytic amount of hydriodic acid into contact with acetone and phenyl beta naphthylamine, and heating the materials at temperatures not substantially higher than 100° C.

17. A process of preparing ketone-amine reaction products which comprises bringing a catalytic amount of hydriodic acid into contact with acetone and diphenylamine and heating the materials at temperatures not substantially higher than 100° C.

18. A process which comprises bringing a catalytic amount of hydriodic acid in contact with acetone and phenyl beta naphthylamine and heating the materials at temperatures not substantially higher than 100° C., separating the resulting ketone-amine reaction product from water and acetone, then subjecting said reaction product to a heat treatment to further react water forming groups to split off further water.

19. A process which comprises bringing a catalytic amount of hydriodic acid in contact with acetone and phenyl beta naphthylamine and heating the materials at temperatures not substantially higher than 100° C., separating the resulting ketone-amine reaction product from water and acetone, then subjecting said reaction product per se to a heat treatment to release further water of condensation.

20. A process which comprises reacting acetone and phenyl beta naphthylamine by refluxing the materials under atmospheric pressure in the presence of a catalytic amount of hydriodic acid, removing water and unreacted acetone, adding fresh acetone to the residue and repeating the refluxing operation.

21. A process which comprises reacting acetone and phenyl beta naphthylamine by refluxing the materials under atmospheric pressure in the presence of a catalytic amount of hydriodic acid, removing water and unreacted acetone, adding fresh acetone to the residue and repeating the refluxing operation, and subsequently separating and washing the resulting reaction product with alkali and water.

22. A process which comprises bringing a catalytic amount of hydriodic acid in contact with acetone and phenyl beta naphthylamine and heating the materials at temperatures not substantially higher than 100° C., separating the resulting ketone-amine reaction product from water and acetone, then subjecting said reaction product per se to a heat treatment to release further water of condensation, and subsequently separating and washing the resulting reaction product with alkali and water.

23. A process which comprises bringing a catalytic amount of hydriodic acid in contact with acetone and phenyl beta naphthylamine and heating the materials at temperatures not substantially higher than 100° C., separating the resulting ketone-amine reaction product from water and acetone, then subjecting said reaction product per se to a heat treatment to release further water of condensation, and subsequently separating and washing the resulting reaction product with ammonia and water.

24. A process which comprises reacting acetone and phenyl beta naphthylamine by refluxing the materials under atmospheric pressure in the presence of a catalytic amount of hydriodic acid, removing water and unreacted acetone, adding fresh acetone to the residue and repeating the refluxing operation, and subsequently separating and washing the resulting product with ammonia and water.

25. A process which comprises reacting acetone and phenyl beta naphthylamine by refluxing the materials under atmospheric pressure in the presence of a catalytic amount of hydriodic acid, removing water and unreacted acetone, adding fresh acetone to the residue and repeating the refluxing operation, and subsequently separating and washing the resulting reaction product with sodium hydroxide and water.

26. A process which comprises bringing a catalytic amount of hydriodic acid in contact with acetone and diphenylamine and heating the materials at temperatures not substantially higher than 100° C., separating the resulting ketone-amine reaction product from water and acetone, then subjecting said reaction product per se to a heat treatment to release further water of condensation.

27. A process which comprises bringing a catalytic amount of hydriodic acid in contact with acetone and diphenylamine and heating the materials at temperatures not substantially higher than 100° C., separating the resulting ketone-amine reaction product from water and acetone, then subjecting said reaction product per se to a heat treatment to release further water of condensation, and subsequently separating and washing the resulting reaction product with alkali and water.

28. A process which comprises bringing a catalytic amount of hydriodic acid in contact with acetone and diphenylamine and heating the materials at temperatures not substantially higher than 100° C., separating the resulting ketone-amine reaction product from water and acetone, then subjecting said reaction product per se to a heat treatment to release further water of condensation, and subsequently separating and washing the resulting reaction product with sodium hydroxide and water.

29. A process which comprises bringing a catalytic amount of hydriodic acid in contact with acetone and diphenylamine and heating the materials at temperatures not substantially higher than 100° C., separating the resulting ketone-amine reaction product from water and acetone, then subjecting said reaction product per se to a heat treatment to release further water of condensation, and subsequently separating and washing the resulting reaction product with ammonia and water.

30. A ketone-amine reaction product resulting from the process set forth in claim 3.

31. A ketone-amine reaction product resulting from the process set forth in claim 4.

32. A ketone-amine reaction product resulting from the process set forth in claim 5.

33. A ketone-amine reaction product resulting from the process set forth in claim 8.

34. A ketone-amine reaction product resulting from the process set forth in claim 10.

35. A ketone-amine reaction product resulting from the process set forth in claim 14.

36. A ketone-amine reaction product resulting from the process set forth in claim 19.

37. A ketone-amine reaction product resulting from the process set forth in claim 20.

38. A ketone-amine reaction product resulting from the process set forth in claim 21.

39. A ketone-amine reaction product resulting from the process set forth in claim 22.

40. A ketone-amine reaction product resulting from the process set forth in claim 23.

41. A ketone-amine reaction product resulting from the process set forth in claim 24.

42. A ketone-amine reaction product resulting from the process set forth in claim 26.

43. A ketone-amine reaction product resulting from the process set forth in claim 27.

44. A ketone-amine reaction product resulting from the process set forth in claim 29.

45. An improved ketone-amine antioxidant resulting from treating with alkali the product of condensation of a ketone with a free amine in the presence of a catalytic amount of a reaction catalyst.

46. An improved ketone-amine antioxidant resulting from treating with alkali the dehydrated product of condensation of a ketone with a free amine in the presence of a catalytic amount of a reaction catalyst.

47. An improved ketone-amine antioxidant resulting from treating with alkali the product of condensation of an aliphatic ketone with an aromatic secondary amine in the presence of a catalytic amount of a reaction catalyst.

48. An improved ketone-amine antioxidant resulting from treating with alkali the dehydrated product of condensation of an aliphatic ketone with an aromatic secondary amine in the presence of a catalytic amount of a reaction catalyst.

49. An improved ketone-amine antioxidant resulting from treating with alkali the product of condensation of a ketone with a free amine in the presence of a catalytic amount of an acidic reaction catalyst, and washing the alkali-treated product with water.

50. An improved ketone-amine antioxidant resulting from treating with alkali the dehydrated product of condensation of a ketone with a free amine in the presence of a catalytic amount of an acidic reaction catalyst, and washing the alkali-treated product with water.

51. An improved ketone-amine antioxidant resulting from treating with alkali the product of condensation of an aliphatic ketone with an aromatic secondary amine in the presence of a catalytic amount of an acidic reaction catalyst, and washing the alkali-treated product with water.

52. An improved ketone-amine antioxidant resulting from treating with alkali the dehydrated product of condensation of an aliphatic ketone with an aromatic secondary amine in the presence of a catalytic amount of an acidic reaction catalyst, and washing the alkali-treated product with water.

LUDWIG MEUSER.
PERCY JOSHUA LEAPER.